United States Patent
Ramaswamy

(10) Patent No.: US 7,284,036 B2
(45) Date of Patent: *Oct. 16, 2007

(54) METHOD, WIRELESS MP3 PLAYER AND SYSTEM FOR DOWNLOADING MP3 FILES FROM THE INTERNET

(75) Inventor: Muralidharan Ramaswamy, Danbury, CT (US)

(73) Assignee: Koninklijke Philips N.V., Eindhoven (NL)

( * ) Notice: Subject to any disclaimer, the term of this patent is extended or adjusted under 35 U.S.C. 154(b) by 640 days.

This patent is subject to a terminal disclaimer.

(21) Appl. No.: 10/118,868

(22) Filed: Apr. 9, 2002

(65) Prior Publication Data

US 2002/0156546 A1    Oct. 24, 2002

Related U.S. Application Data

(63) Continuation of application No. 09/772,483, filed on Jan. 29, 2001, now Pat. No. 6,423,892.

(51) Int. Cl.
*G06F 15/16* (2006.01)

(52) U.S. Cl. .......................... 709/217; 709/219; 700/94

(58) Field of Classification Search ................ 709/200, 709/217, 219; 369/30; 700/94
See application file for complete search history.

(56) References Cited

U.S. PATENT DOCUMENTS

| | | | |
|---|---|---|---|
| 5,978,833 A * | 11/1999 | Pashley et al. ............. | 709/200 |
| 6,248,946 B1 * | 6/2001 | Dwek .......................... | 84/609 |
| 6,423,892 B1 * | 7/2002 | Ramaswamy ................ | 84/609 |
| 6,662,231 B1 * | 12/2003 | Drosset et al. .............. | 709/229 |
| 6,760,916 B2 * | 7/2004 | Holtz et al. .................. | 725/34 |
| 2002/0035619 A1 * | 3/2002 | Dougherty et al. ......... | 709/219 |
| 2004/0204116 A1 * | 10/2004 | Ben-Efraim et al. ........ | 455/564 |
| 2005/0096018 A1 * | 5/2005 | White et al. ............. | 455/414.1 |

FOREIGN PATENT DOCUMENTS

WO       WO00/54462       9/2000

OTHER PUBLICATIONS

John Borland: "MP3s are wireless phone companies' next goal" Sep. 21, 2000, pp. 1-3.

* cited by examiner

*Primary Examiner*—Brian T. Pendleton

(57) ABSTRACT

Apparatus for wirelessly downloading MP3 files from the Internet comprising a WAP network, a music server, an MP3 content site, and a wireless MP3 player for establishing data communications through the WAP network. In operation, the MP3 player establishes data communication with the music server through the WAP network and the Internet. Data is input into the wireless MP3 player that defines particular music desired by a user to instruct the music server to effect a search of the MP3 content sites to locate MP3 files relating to the desired music. The MP3 player displays at least one title of an MP3 file located in the search. The MP3 player operates to select the title thereby instructing the music server to upload an MP3 file that corresponds to the selected title, and download the uploaded MP3 file to the wireless MP3 player.

27 Claims, 2 Drawing Sheets

METHOD, WIRELESS MP3 PLAYER AND SYSTEM FOR DOWNLOADING MP3 FILES FROM THE INTERNET

CROSS REFERENCE TO RELATED APPLICATIONS

This is a continuation divisional of application Ser. No. 09/772,483 filed Jan. 29, 2001 now U.S. Pat. No. 6,423,892.

BACKGROUND OF THE INVENTION

1. Field of the Invention

The present invention generally relates to a wireless MP3 player.

2. Description of Related Art

MP3 (MPEG Audio Layer-3) format is a compression system for digital music that helps reduce the size of a digitized song without degrading the sound quality. Digital music is converted to MP3 format and made available on the World Wide Web for individual use. MP3 files can be downloaded from the Internet using a computer and special software. Furthermore, a personal computer programmed with the appropriate software can covert digital music from a CD (compact disk) into MP3 format. Currently, MP3 files can be played in three different ways: (i) MP3 files can be played directly on a personal computer, (ii) MP3 files can be decompressed and recorded it onto a CD, and (iii) the MP3 files can be played on an MP3 player. MP3 players are relatively small, lightweight, portable devices that can interface with a personal computer. Thus, a user can download MP3 files from the Internet and load such MP3 files onto the MP3 player. Typically, the MP3 player can be connected to the personal computer's parallel or USB port in order to receive the downloaded MP3 files.

SUMMARY OF THE INVENTION

The present invention is directed to a method, a wireless MP3 player, and a system for locating MP3 files of interest on the Internet and downloading such files. The wireless MP3 player is used in conjunction with a wireless application protocol (WAP) network. The wireless MP3 player allows the user to enter certain keywords to denote the desired type of MP3 music. The wireless MP3 player establishes a direct connection to a dedicated music server. The keywords are inputted into the music server. A plurality of MP3 content sites are in data communication with the Internet and thus, accessible to the music server. The music server searches the Internet, and thus the MP3 content sites, for MP3 files that relate to the keywords. The music server generates a table comprising a list of titles of MP3 files and corresponding world wide web links wherein such MP3 files can be located. The music Internet server generates a user identification and then sends the table and user identification to the wireless MP3 player. The wireless MP3 player contains a display which displays the table. The user then uses the appropriate function keys of the wireless MP3 player to browse the table and select a title or titles of MP3 files of interest. The user then uses the appropriate function keys of the wireless MP3 player to instruct the music server to download the MP3 file associated with the selected title. The music server then downloads the selected MP3 file. Once the MP3 file is completely downloaded to the music server, the music server uploads the MP3 file to the Internet for retrieval by the wireless MP 3 player. The wireless MP3 player waits for the MP3 files to be downloaded. The downloaded MP3 files are stored in a buffer read/write memory of the wireless MP3 player. When each MP3 file is completely loaded, the wireless MP3 player marks each MP3 file with indicia indicating that the particular MP3 has been completely loaded is ready to be played. The wireless MP3 player includes "Play" and "Stop Play" function keys. When the user depresses the "Play" key, the completely loaded MP3 files will play in the order in which they were loaded unless the user selects MP3 files out of order. Depressing the "Stop Play" key stops play of the MP3 file currently being played, but does not stop the further download of MP3 files. The user can also delete previously loaded MP3 files so as to clear memory space in order to download play new MP3 files.

BRIEF DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

DETAILED DESCRIPTION OF THE INVENTION

Figure 1:
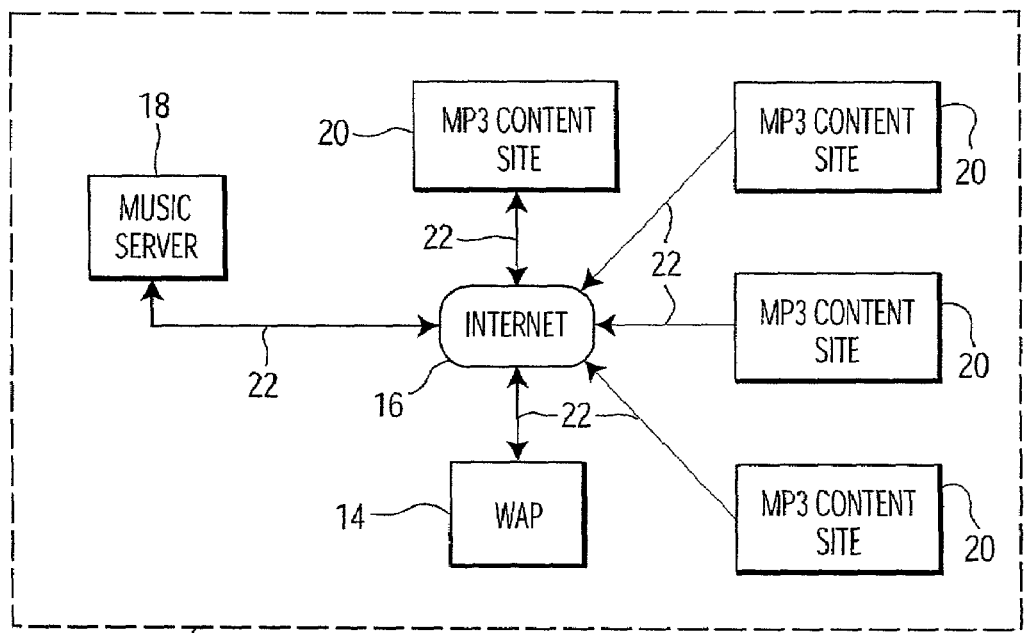
FIG. 1 shows a pictorial diagram of the wireless MP3 player of the present invention and a block diagram of a network with which the wireless MP3 player is used.
Figure 1:
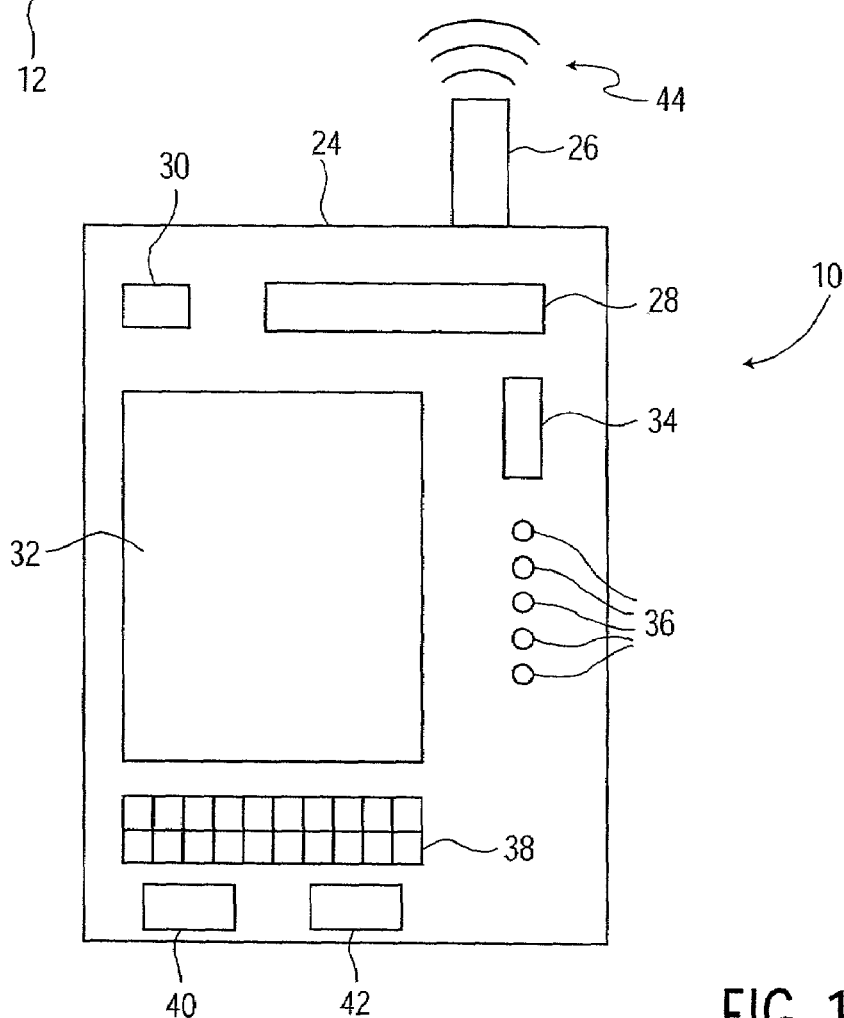

Referring to FIG. 1, there is shown wireless MP3 player 10 of the present invention. Player 10 is configured in accordance with a combination of technologies used in the field of cellular phones, hand held radio frequency communication devices, personal digital assistants, and portable audio devices such as portable compact disk players. The configuration of MP3 player 10 is discussed in the ensuing description. In accordance with the present invention, player 10 is used in conjunction with network 12. Network 12 comprises WAP (wireless application protocol) network 14, Internet network 16, music server 18 and MP3 content sites 20. WAP network 14 is in electronic data communication with Internet network 16 via data communication link 22. Music server 18 is in electronic data communication with Internet network 16 via data communication link 22. Similarly, MP3 content sites 20 are is in electronic data communication with Internet network 16 and dedicated music server 18 via data communication link 22. In one embodiment, data communication link 22 is configured as a telephone line. Referring to FIG. 1, player 10 generally comprises housing 24, antenna 26, display 28, connect/disconnect function key 30, display 32, browse/select wheel or knob 34, function keys 36, keypad 38, "Play" function key 40, and "Stop Play" function key 42. Connect/disconnect function key 30 allows the user to establish or terminate data communication with WAP network 14. The user can use keypad 38 to input data which will appear in display 28. Display 32 displays information relating to titles or names of songs, musical compositions, types of music, e.g. jazz, classical, Hindustini, etc. The user uses browse/select wheel or knob 34 to select one or more titles shown in display 32. Function keys 36 provide several functions such as volume, bass, treble, DNR (Dolby™ Noise Rejection), etc. The user depresses function keys 40 and 42 to start and stop, respectively, play of music. Player 10 includes audio output devices (not shown) such as a speaker or head phone connector. Player 10 further includes a read/write buffer memory (not shown) for storing downloaded MP3 files.

Figure 2:
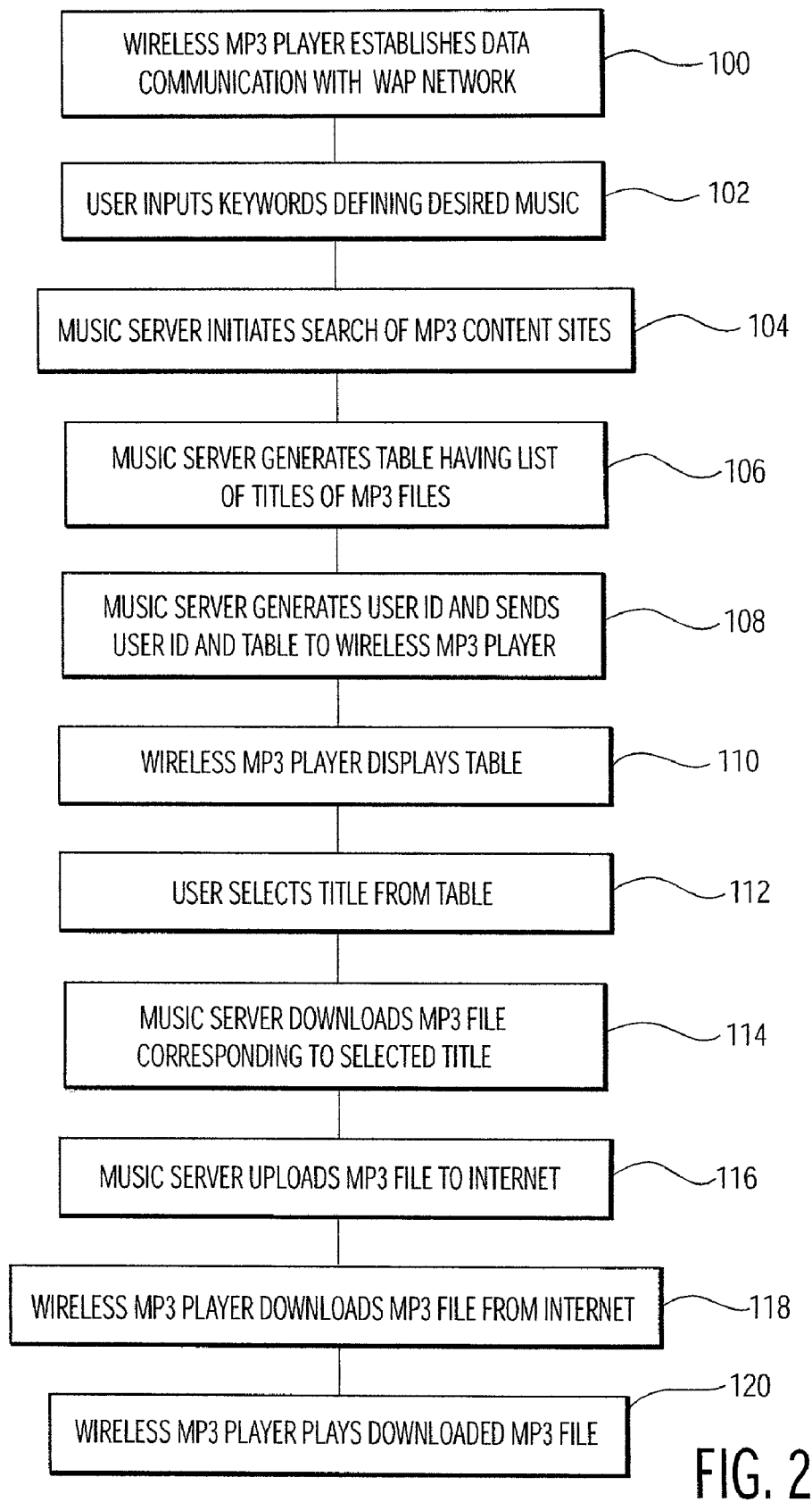
FIG. 2 is a flow diagrams illustrating the method of the present invention.

Each step of the method of the present invention is explained in the ensuing description with reference to FIGS. 1 and 2.

In step 100, the user operates player 10 to transmit signal 44 to. WAP network 14 so as to establish data communication between player 10 and Internet network 16. In order to establish such data communication, the user uses connect/disconnect key 30 on player 10. Once this is accomplished, data communication can be established between player 10 and music server 18.

In step 102, the user then inputs information into player 10 via keypad 38. This information generally comprises a keyword or keywords that describes a particular song, type of music, particular artist or performer, etc. For example, the user can input the key word "Beethoven". Other examples of keywords are "jazz", "classical", and "Hindustini". The user then depresses an appropriate one of the function keys 36 so as to instruct music server 18 to initiate a search of the MP3 content sites 20 to locate MP3 files that relate to the keyword. As the user inputs the keywords, the keywords appear in display 28.

In step 104, music server 18 responds to the keywords by initiating a search of the MP3 content sites 20 to locate MP3 files that relate to the keyword or keywords.

In step 106, music server 18 generates: (i) a list of titles of MP3 files that were located in the search, (ii) a list of corresponding world-wide-web links wherein each link corresponds to a particular MP3 file, and (iii) corresponding index indicia wherein each indicia corresponds to a particular title and link. Music server 18 then generates a table comprising the list of titles of MP3 files that were located in the search and the corresponding index indicia.

In step 108, music server 18 generates a user identification and transmits the user identification and table to wireless MP3 player 10.

In step 110, wireless MP3 player 10 receives signals containing data that defines the user identification and table. The table appears in display 32 of player 10. The user uses wheel or knob 34 to browse the table. Table I illustrates one example of a table generated by music server 18.

TABLE I

| TITLE OF MP3 FILE | INDEX INDICIA |
|---|---|
| Louis Armstong's Hits | #1 |
| Beethoven's 9$^{th}$ Symphony | #2 |
| Hindustini Favorites | #3 |

In step 112, the user then uses wheel or knob 34 or one of function keys 36 to effect the selection of an index indicia that corresponds to the desired music title. In response, player 10 transmits the user identification and the index indicia of the selected music title. Data defining the user identification is also transmitted along with data defining the selected index indicia.

In step 114, WAP network 14 receives the data transmitted from player 10 and routes the data to Internet network 16 wherein it is received by music server 18. In response, music server 18 stores the selected index indicia and downloads an MP3 file that corresponds to the selected index indicia using their corresponding web links. Specifically, music server 18 downloads the MP3 file from one of the MP3 content sites 20 that is storing the MP3 file.

In step 116, music server 18 uploads the MP3 file to Internet network 16. Music server 18 generates a signal for input into player 10 to notify the user that an MP3 file has been retrieved and is ready for downloading. In one embodiment, a message appears in display 32 that informs the user that an MP3 file has been uploaded to the Internet network 16 and is ready for downloading.

In step 118, once player 10 receives the signal generated in step 116, player 10 automatically switches to the download mode and downloads the MP3 files. While the MP3 file is being downloaded, player 10 is constantly monitoring the capacity of the buffer memory in player 10. If the buffer memory should become full, player 10 generates and transmits a signal to music server 20 in order to stop music server 18 from downloading the MP3 file or files. As space becomes available in the buffer memory, player 10 automatically transmits a signal to music server 18 to resume downloading the MP3 files.

In step 120, when at least one MP3 file is completely downloaded, player 10 indicates that it is ready to play the music in that MP3 file by displaying a message in display 32. The user then presses "Play" key 40 to play the music of the completely loaded MP3 file. In an alternate embodiment, player 10 includes a "Ready To Play" light that notifies the user that player 10 is ready to play the music in the completely downloaded MP3 file. Next, the user then selects the listening mode, e.g. speaker or head phones. The user then depresses "Play" key 40 and player 10 plays the selected title.

The user can repeat the steps described in the foregoing description as many times as needed to in order to download and play different MP3 files.

An important feature of player 10 is that player 10, and the user, need not wait for all the MP3 files to be downloaded. Player 10 is configured to start playing the first' completely downloaded MP3 file while simultaneously downloading other MP3 files. This feature provides continuous play of music without interruption.

In one embodiment, the user can operate player 10 to request that music server 18 store the titles of all of the user's downloaded MP3 files and corresponding links for these titles. In such a configuration, music server 18 generates a list of the titles of downloaded MP3 files in the event that the user would like to hear a particular musical title again. This configuration enables music server 18 to immediately establish a link with the MP3 content site 20 that has that particular MP3 file without having to conduct another search of all MP3 content sites 20.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method for downloading digital music files to a wireless device that functions primarily as a digital music player, from at least one digital music content site, wherein the digital music content site and a music server are in data communication with the Internet, the method comprising the acts of:

receiving from the wireless device through the Internet, data that defines desired music;

instructing the music server to effect a search of the digital music content site to locate digital music files relating to the desired music;

providing to the wireless device data relating to at least one title of a digital music file located in the search;

receiving from the wireless device data relating to a selected title;

instructing the music server to upload a digital music file that corresponds to the selected title; and downloading the uploaded digital music file to the wireless device.

2. The method of claim 1, comprising the act of
storing a result from the search.

3. The method of claim 2, comprising the acts of:
receiving from the wireless device data relating to a request for data relating to the stored result; and
providing to the wireless device the data relating to the stored result.

4. The method of claim 3, comprising the acts of:
receiving from the wireless device data relating to a selected title from the stored result;
instructing the music server to upload a digital music file that corresponds to the selected title from the stored result; and
downloading the uploaded digital music file to the wireless device.

5. The method of claim 1, comprising the acts of:
receiving from the wireless device a signal indicating a present memory occupancy of the wireless device; and
stopping downloading of a portion of the uploaded digital music file when the present memory occupancy exceeds a predetermined level.

6. The method of claim 5, comprising the acts of:
receiving from the wireless device a further signal indicating a further present memory occupancy of the wireless device; and
downloading the portion of the uploaded digital music file when the further present memory occupancy falls below the predetermined level.

7. The method of claim 1, wherein the act of providing to the wireless device data relating to at least one title of a digital music file located in the search, comprises the acts of:
generating data corresponding to a table comprising a title, a corresponding link, and a corresponding index indicia; and
providing to the wireless device the generated data corresponding to the table.

8. The method of claim 1, wherein the act of providing further comprises the acts of:
generating a user identification; and
transmitting the user identification to the wireless device.

9. The method of claim 8, wherein the act of receiving from the wireless device data relating to the selected title, further comprises the act of
receiving the user identification from the wireless device.

10. The method of claim 1, wherein
the downloading act comprises the act of providing to the wireless device a signal indicating to a user that the digital music file is ready to be downloaded from the Internet.

11. A music server that is configured to download music files to a wireless device using the method of claim 1.

12. A method comprising:
receiving a request for music from a user device,
searching one or more content providers for music content that satisfies the request,
storing an identifier of the user device, a title of each music content, and a location of each music content,
transmitting the title of each music content and an index corresponding to each music content to the user device,
receiving the identifier of the user and a select index from the user device,
uploading select music content based on the stored location corresponding to the identifier of the user device and the select index,
downloading the select music content to the user device.

13. The method of claim 12, including
transmitting a notification to the user device following the uploading of the select music content,
receiving a response to the notification from the user device, and
controlling the downloading based on the response.

14. The method of claim 13, including
receiving other responses from the user device, and
controlling the downloading based on these other responses.

15. The method of claim 13, including
transmitting a second notification to the user device following the downloading.

16. The method of claim 12, wherein
the request includes one or more keywords, and
the method includes creating a search request based on the one or more keywords, and
the searching includes transmitting the search request to at least one of the one or more content providers.

17. The method of claim 12, including
creating the identifier of the user device, and
transmitting the identifier of the user device to the user device.

18. The method of claim 12, wherein
the receiving and transmitting includes communication via a wireless access protocol (WAP) network.

19. A music server that is configured to download music files to a wireless device using the method of claim 12.

20. A method comprising:
receiving a request for music from a user device, the request including one or more keywords,
creating a search request based on the one or more keywords,
transmitting the search request to one or more content providers,
receiving a plurality of identifiers of music content from the one or more content providers in response to the search request,
transmitting a list of titles to the user device based on the identifiers of the music content,
receiving a user selection from the user device,
uploading select music content corresponding to the user selection from at least one of the one or more content providers,
downloading the select music content to the user device.

21. The method of claim 20, wherein
the receiving and transmitting from and to the user device includes communication via a wireless access protocol (WAP) network.

22. The method of claim 20, including
transmitting a notification to the user device following the uploading of the select music content, receiving a response to the notification from the user device, and controlling the downloading based on the response.

23. The method of claim 22, including receiving other responses from the user device, and controlling the downloading based on these other responses.

24. The method of claim 22, including transmitting a second notification to the user device following the downloading.

25. The method of claim 20, including storing an identifier of the user device, and a location of each music content, wherein receiving the user selection includes receiving the identifier of the user device and an index that facilitates retrieval of the location of the select music content.

26. The method of claim 25, including creating the identifier of the user device, and transmitting the identifier of the user device to the user device.

27. A music server that is configured to download music files to a wireless device using the method of claim 20.

* * * * *